May 13, 1941.  M. E. HANSEN  2,241,814
MANUFACTURE OF SHEET RUBBER
Filed Dec. 21, 1938  3 Sheets-Sheet 1
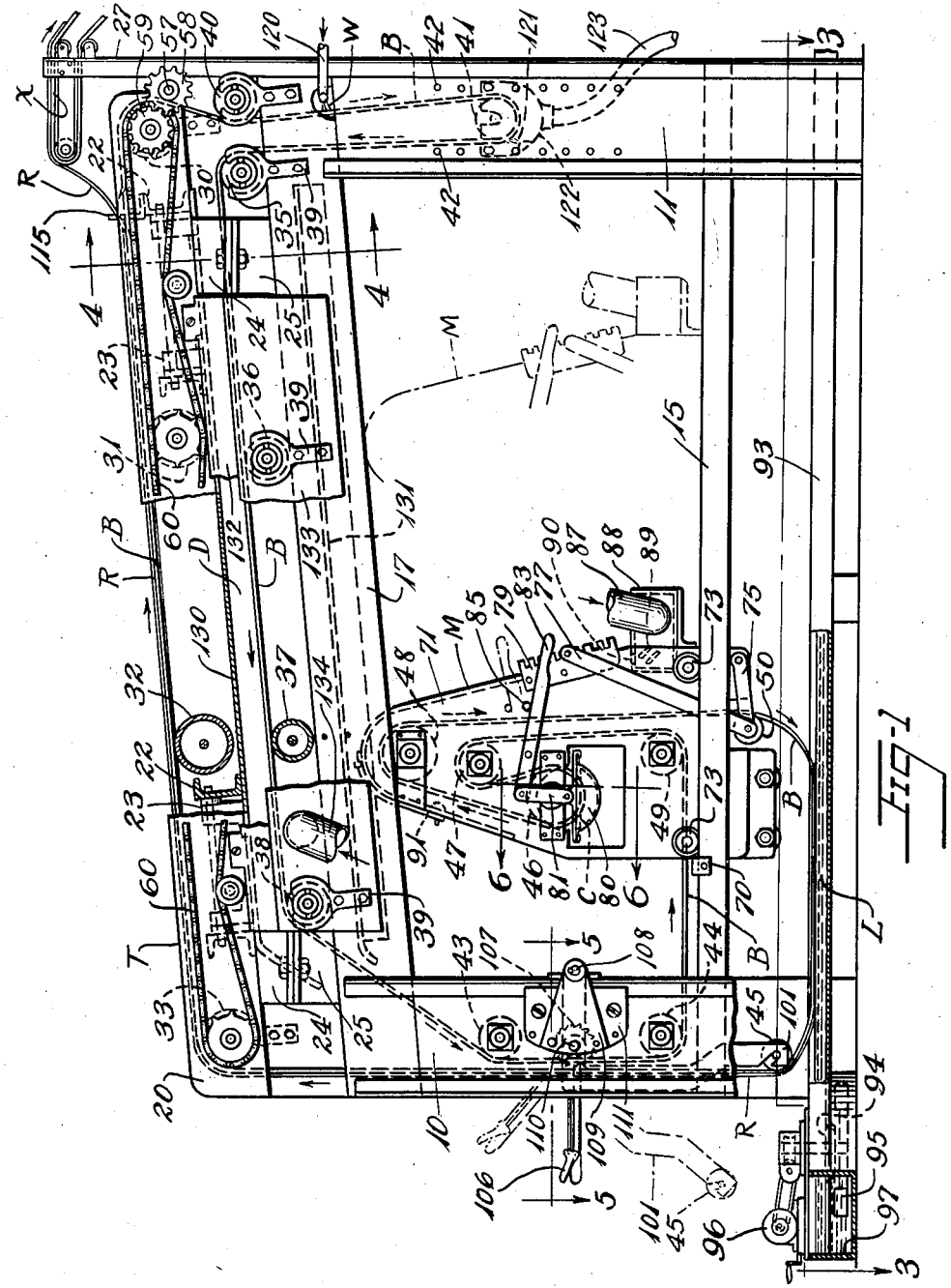
Inventor
Merrill E. Hansen
By Willis F. Avery
Atty.

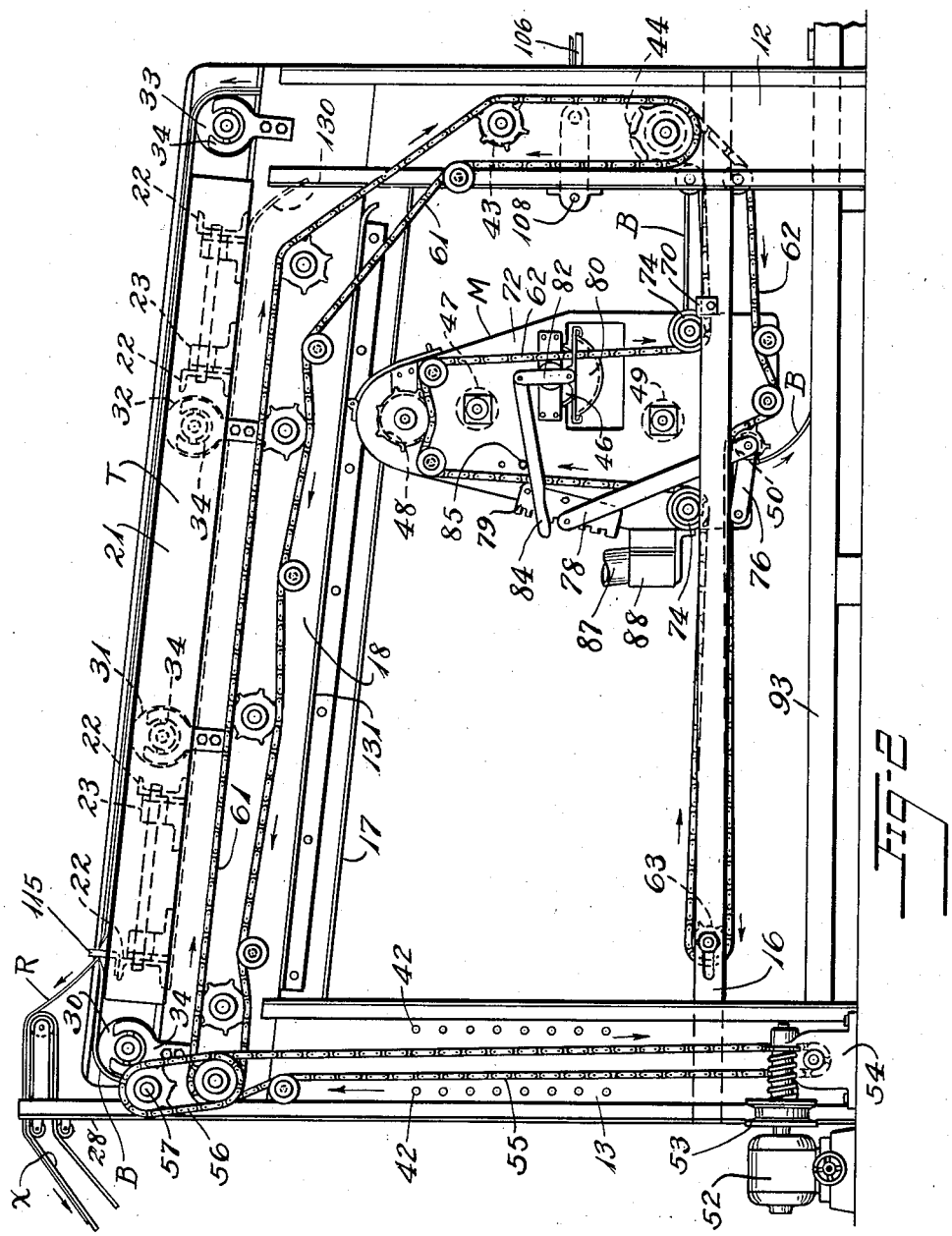

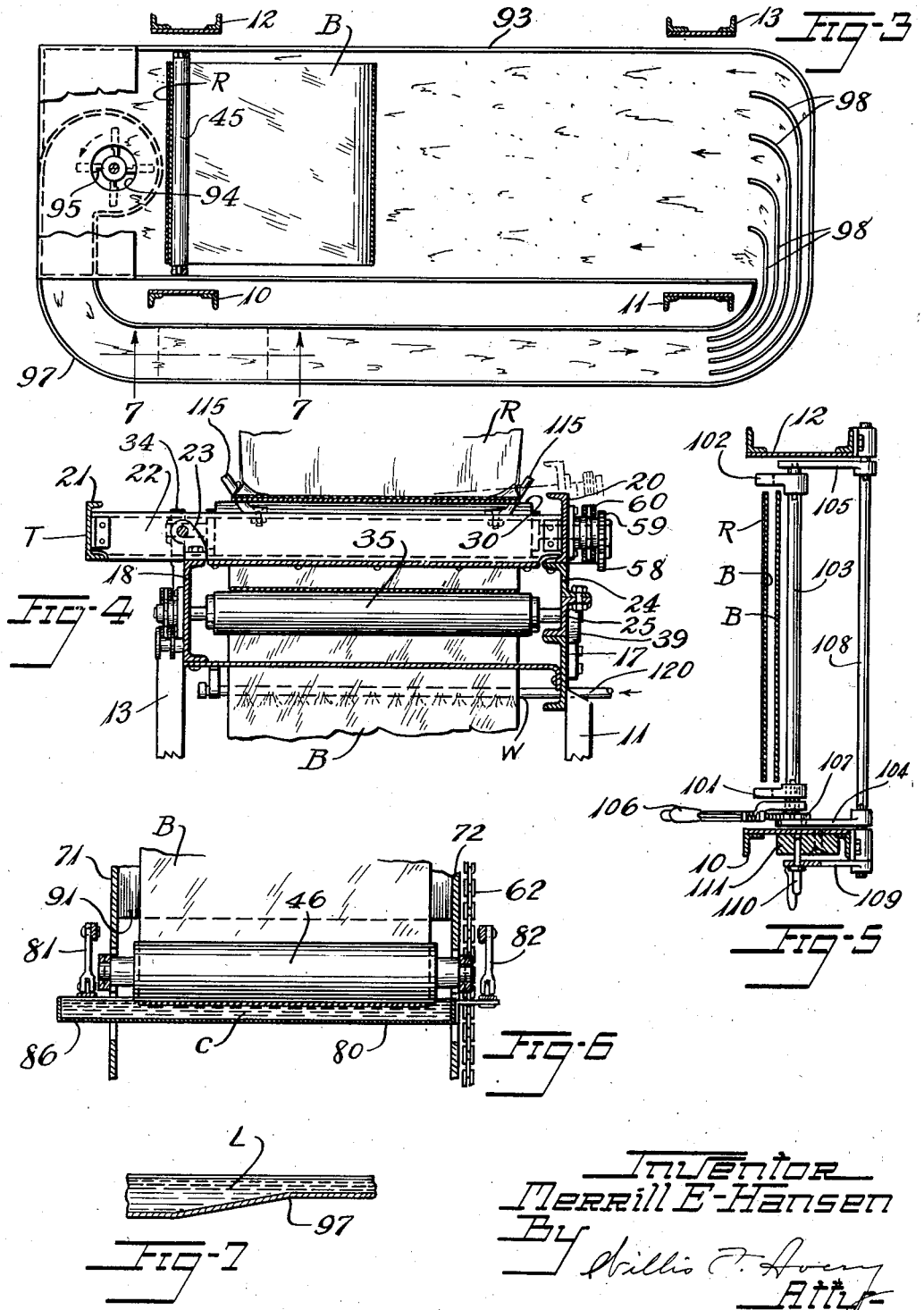

Patented May 13, 1941

2,241,814

UNITED STATES PATENT OFFICE 2,241,814

MANUFACTURE OF SHEET RUBBER

Merrill E. Hansen, Akron, Ohio, assignor to American Anode Inc., Akron, Ohio, a corporation of Delaware Application December 21, 1938, Serial No. 247,044

16 Claims. (Cl. 18—15)

This invention relates to apparatus and procedure for applying latex and analogous dispersions to travelling deposition bases and is especially useful in the manufacture of long lengths of rubber sheeting.

In my copending application Serial No. 57,694, filed January 6, 1936, which has now matured into U. S. Patent No. 2,147,293, granted February 14, 1939, I have described and claimed a method in which a sheet deposition base is caused to travel in a path including a free loop and the bottom of the free loop is maintained in progressive floating contact with the surface of a body of liquid rubber latex to receive a coating of latex rubber. The coating of latex rubber may be dried and allowed to remain upon the sheet deposition base as a permanent coating, or it may be stripped from the base in the form of a continuous sheet or strip of rubber. The present application is directed primarily to particular apparatus designed to carry the principles of the aforesaid earlier application into efficient and economical commercial use, particularly in the manufacture of rubber sheeting, but also contains certain novel procedural concepts as will appear more fully as the description of the invention proceeds.

The general objects of the invention are to provide economical and efficient apparatus and procedure for applying coatings of latex rubber and analogous materials to deposition bases; to provide economical and efficient apparatus and procedure for manufacturing sheet material from latex and analogous dispersions; to provide flexible apparatus readily variable and adjustable to produce sheets of various thickness; to provide such flexible apparatus and procedure which shall at the same time be capable of consistently producing large quantities of sheet material of highly uniform thickness and quality once the apparatus is adjusted to produce any particular thickness of sheet; to provide apparatus and procedure continuously operable to produce high quality sheet material with minimum labor and attention; and other objects of a similar nature.

Among the more specific objects of the invention directed toward the attainment of the foregoing general objects are the provision of apparatus including a travelling belt having a looped reach in floating contact with latex or other coagulable dispersion together with means for applying a highly uniform coating of coagulant composition to the belt prior to its floating contact with the latex; the provision of readily adjustable means for varying the length of the belt reach in floating contact with the latex, preferably, without altering the conditions affecting application of the coagulant coating to the belt; the provision of such apparatus embodying means for temporarily removing the belt from contact with the latex; the provision of apparatus and procedure effecting floating contact between the belt and the latex with minimum disturbance of the latex and consequent production of maximum uniformity in the deposited rubber sheet; to provide procedure and apparatus for stripping the deposited rubber sheet from the deposition belt with minimum damage to the sheet; the provision of apparatus embodying an endless deposition belt and being so constructed and arranged as to permit ready replacement of the belt in endless form with minimum dismantling of the apparatus; and other specific objects which will become evident.

The invention will be described in considerable detail as exemplified by a preferred embodiment illustrated in the accompanying drawings, of which Fig. 1 is an elevation showing one side of apparatus for producing sheet material according to the present invention, portions of the apparatus being broken away and shown in section for clarity of illustration;

Fig. 2 is an elevation showing the reverse side of the apparatus of Fig. 1;

Fig. 3 is a horizontal section taken on line 3—3 of Fig. 1 and showing more particularly the tank containing the latex or other dispersion and the auxiliary latex circulating equipment;

Fig. 4 is a vertical section taken on line 4—4 of Fig. 1;

Fig. 5 is a horizontal section taken on line 5—5 of Fig. 1;

Fig. 6 is a vertical section taken on line 6—6 of Fig. 1;

Fig. 7 is a vertical section taken on line 7—7 of Fig. 3.

The drawings illustrate a preferred apparatus for producing relatively wide sheets of latex rubber or analogous material directly from liquid rubber latex or other dispersions according to the invention of the aforesaid copending application. In its general aspects, the apparatus comprises an endless deposition belt B which, by means of appropriate guide rolls and driving mechanism, is caused to traverse a multi-looped path as shown. In the course of its travel, the belt B is brought into contact and is coated with a coagulant composition C. Then the coagulant-coated belt is brought into progressive floating contact with latex or other coagulable dispersion L where it receives a deposit of coagulated latex rubber or analogous material R forming a sheet. The rubber sheet R is carried on the belt B at least until the rubber has acquired a satisfactory self-sustaining consistency and the sheet of rubber then is stripped from the belt B and conveyed, by means of an auxiliary conveyor X, to conventional washing, drying and vulcanizing apparatus of the character disclosed in the aforementioned copending application or to any other appropriate finishing apparatus. After the rubber R has been stripped, the belt B is reconditioned by passage through a washer W and a dryer D, and then is passed through the cycle again.

In the following more detailed description of the apparatus, all directional expressions such as right, left, clockwise, counter-clockwise, and the like will be employed with reference to the apparatus viewed as shown in Fig. 1, and the side of the apparatus shown in Fig. 1 will be designated the front side while the reverse side shown in Fig. 2 will be designated as the rear side.

The apparatus comprises a structural steel framework comprising four corner uprights 10, 11, 12 and 13, each conveniently made up of two angle iron strips connected by a relatively wide plate as shown to provide sufficient space for mounting various parts of the apparatus. The front uprights 10 and 11 are connected at points substantially spaced from the bottoms by a front horizontal cross-rail 15, and the rear uprights 12 and 13 are connected by a similarly positioned rear cross-rail 16 disposed parallel to and on a level with the front cross-rail 15. The right front upright 11 extends somewhat higher than the left front upright 10 and the tops of the two front uprights are connected by a sloping front main stringer 17. Similarly, the right rear upright 13 extends somewhat higher than the left rear upright 12 and the tops of the two rear uprights 12 and 13 are connected by a sloping rear main stringer 18 which is parallel to but somewhat higher than the front main stringer 17. Suitable cross braces (not shown) are provided at each end of the framework to stabilize the two trapezoidal side frames and produce a rigid structure.

Mounted on top of the framework thus far described is provided a tiltable flat framework T consisting of a sloping front stringer 20, a sloping rear stringer 21, and cross members 22, 22, the framework T being hinged to the top edge of the rear main stringer 18 by means of the hinges 23, 23, so that the framework T may be tilted upward from the front, like a trunk-top, as indicated by the dotted lines in Fig. 4, for the purpose of facilitating introduction of the endless belt B as will more clearly appear later. The rear edge of the framework T preferably overhangs the main framework as shown so that counter-weights may be hung thereon to facilitate the tilting operation. The front edge of the tiltable framework T is normally supported by two depending Z-shaped brackets 24, 24 which, in the normal position, rest upon similar Z-shaped brackets 25, 25 projecting upward from the main front stringer 17. The cooperating brackets may be bolted or otherwise secured together during normal operation of the apparatus.

The outside angle irons of the right end uprights 11 and 13 desirably are extended upward above the rest of the framework as shown at 27, 28 to provide support for the auxiliary conveyor X.

A series of belt-guiding rolls 30, 31, 32, 33 are mounted in sloping alignment crosswise within the tilting frame T, the front ends of the roll shafts being journalled in bearings mounted on the front stringer 20 while the rear ends of the roll shafts are journalled in self-aligning tilting bearings 34, 34, the supporting yokes of which are secured to the rear main stringer 18 so that the rolls may tilt with the framework T although not carried wholly by that framework but partly by the main framework.

A second series of four belt-guiding rolls 35, 36, 37 and 38 are mounted in sloping alignment below the first series of rolls 30 to 33, the rear ends of these roll shafts being journalled in the rear main stringer 18 while the front ends of the shafts are mounted in self-aligning bearings 39, 39, the yokes of which are secured to and project upward from the front main stringer 17.

A fifth similar roll 40 is similarly mounted adjacent the right end of the apparatus in sloping alignment with the rolls 35 to 38.

A terminal belt-guiding roll 41 is mounted crosswise between the right end uprights 11 and 13 upon bearings adapted to be adjusted vertically to various positions as indicated by the locking holes 42, 42. Also the terminal roll 41 is adapted to be readily removed for insertion of the looped end of an endless belt.

Two similar guide rolls 43 and 44 are mounted in vertical alignment between the left end uprights 10 and 12. Swingably mounted somewhat below and normally to the left of the guide roll 44 in a manner hereinafter more fully described is provided a loop guide roll 45.

The various guide rolls conveniently may be made of aluminum tubing, preferably sand-blasted and in some instances wrapped with fabric to provide frictional belt-gripping surfaces. All the rolls, of course, are mounted with their axes in parallel relation.

The endless deposition belt B, which may be a rubberized fabric belt or other belt floatable on the surface of latex as described in my copending application, is directed over the various guide rolls as indicated in the drawings. The belt loops about the terminal roll 41, passes upward, about the roll 35, then across the series of rolls 35 to 38, then about the rolls 43 and 44 to the roll 49 on the carriage M. The belt then is directed upward over the roll 47 and is looped downward about the terminal roll 46. Thereafter the belt passes upward over the roll 48, downward past the loop-guide roll 50 in a free loop floatingly contacting the latex L and then turning upward past the loop-guide roll 45, then upward to the roll 33, over the tops of the series of rolls 33, 32, 31, and 30, and finally back past the roll 40 to the starting point at the terminal roll 41.

The apparatus is designed to eliminate the necessity of threading a belt about the various rolls and then joining the ends of the belt, as such procedure produces a rough or irregular zone at the belt joint which in turn produces defects in the sheet material deposited thereon. An endless belt having a perfect joint may be made and inserted in the present apparatus simply by tilting the frame T upward and placing a loop of the belt around it, removing the roll 41 and inserting it in one end of the loop and placing the other end of the loop about the rolls on the carriage M, which will require that the rolls 45, 46, 48 and 50 be removed temporarily and re-inserted inside the loop.

The mechanism for driving the various rolls and thereby causing the belt B to traverse its looped path includes, on the rear side of the apparatus, a motor 52, a variable speed pulley 53, and a gear-reducing unit 54 driving the roll 40 in a counter clockwise direction by means of the sprocket chain 55 (the cooperating sprockets on the various roll shafts will not be mentioned individually). The roll 40 in turn drives, through a sprocket chain 56, a counter-shaft 57 extending across the top right end of the apparatus. The counter-shaft 57 carries at its front end a spur gear 58 which engages a spur gear 59 mounted on the shaft of the roll 30, the spur gears 58 and 59 being so arranged that they may be readily disengaged and re-engaged when the framework T is tilted upward. The roll 30 is thereby driven in a clockwise direction and it in turn drives the rolls 31, 32, and 33 in the same direction by means of the sprocket chain 60 extending along the front side of the framework T. Still another sprocket is mounted on the shaft of the roll 40 to drive the sprocket chain 61 extending along the rear side of the apparatus and driving the rolls 35, 36, 37, 38, 43, and 44 in a counter-clockwise direction. A further sprocket chain 62 driven by a sprocket on the roll 44 extends along the inside of the rear side-rail 16 and drives the rollers 48 and 50 on the carriage M. The chain is passed about various sprockets and idlers on the carriage M and is extended in a long loop about an idler 63 located adjacent the right end of the rail 16 in such manner that the carriage M may be moved freely along the rail 16 without disturbing the operation of the driving mechanism.

The movable carriage M comprises front and rear side members 71, 72, respectively, connected by cross-braces (not shown) to provide a rigid structure carrying the several belt-guiding rolls hereinbefore mentioned. The front end of the carriage M is supported by two wheels 73, 73 mounted on the outside face of the front side member 71 and being adapted to roll along the front side rail 15. The rear end of the carriage M is similarly supported by two wheels 74, 74 adapted to roll along the rear side rail 16. Locking lugs 70, 70 may be clamped on the rails to lock the movable carriage M in a desired position. It may thus be seen that the carriage M including the terminal roll 46 is adapted to be moved longitudinally of the apparatus along the side rails 15 and 16 and thereby to vary the length of the belt reach in floating contact with the latex L, the other terminal roll 41 being adjusted vertically to an appropriate corresponding position, thereby maintaining the latex-contacting loop of the belt with the proper sweep irrespective of the position of the carriage M. In this manner, the thickness of the deposited sheet may be varied within wide limits as the time of contact between the coagulant-coated belt and the latex is a principal factor governing thickness.

For further adjusting the sweep of the latex contacting loop of the belt B, and particularly for varying the angle of contact of the belt with the latex to obtain minimum rippling of the latex at the line of contact with the belt, the loop-guiding roll 50 is swingably mounted on front and rear swinging arms 75, 76 depending from the respective side members 71, 72, and being supported in a desired position of adjustment by the front and rear supporting arms 77, 78, each adapted to engage respective racks 79, 79 mounted on the side members 71, 72.

While providing for varying the time of contact between the belt B and the latex L, it is important that such variations shall not disturb the conditions under which the coagulant coating is applied to the belt. The coagulant composition usually comprises a polyvalent metal salt dissolved in a volatile solvent containing a wetting agent, and the composition is dried after application to the belt to form a non-flowing coating. The condition of the coating at the time of contact with the latex seriously affects the quality and particularly the uniformity of the deposited sheet. Slight variations in the extent to which the coating is dried cause substantial variations in properties of the coagulant coating and of the deposited rubber. In the present apparatus, the equipment for coating the belt with coagulant is mounted on the movable carriage M to insure that the coagulant coating shall be uniformly dried to the same consistency whatever the length of the belt reach in contact with the latex.

For applying the coagulant composition C to the belt B, a pan 80 of semi-circular cross-section is provided underneath the terminal roll 46 in such position as normally to immerse the lower portion of the belt loop about the roll 46 in the coagulant contained in the pan. To provide for readily removing the coagulant from contact with the belt before operation of the rest of the apparatus is stopped, which is desirable when stopping production, means are provided for raising and lowering the pan 80. Such means comprises front and rear supporting links 81 and 82 engaged respectively with pivoted hand levers 83 and 84 adapted to be locked in raised and lowered positions as by the pins 85, 85. The respective ends of the pan 80 extend through appropriate openings in the carriage side members 71, 72 for engagement with the supporting linkage, and one end of the pan preferably extends a substantial distance past the supporting linkage as at 86 (see Fig. 6) to permit convenient filling of the pan 80 with coagulant composition.

For drying the coagulant composition on the belt to form a non-flowing coating, air is supplied through a duct 87 leading to a heating and distributing chamber 88 extending across the carriage M adjacent the downward reach of the belt B between the rolls 48 and 50. The chamber 88 contains strip electric heating elements 89 which heat the air to a desired temperature after which the air is discharged through openings 90 in the chamber wall. A sheet metal baffle 91 follows the path of the belt B upward over the roll 48 and down to a point adjacent the roll 46 and serves to direct the heated air over the belt surface freshly-coated with coagulant composition, and in effect forms a closed hood about the top of the movable carriage M. As the coagulant applying and drying equipment is mounted on and moves with the carriage M, it is apparent that the coagulant coating on the belt will be dried uniformly whatever the position of the carriage M. The distance traversed by the belt between application of the coagulant and contact with the latex is constant.

For avoiding ripples at the line of initial contact between the belt B and the latex L and thereby eliminating resultant irregularities in the deposited rubber sheet, the entire body of latex L adjacent the belt is maintained in steady motion in a direction parallel to the direction of travel of the belt and preferably in the same direction as the travel of the belt, at a current speed approximating the linear speed of the belt. The apparatus containing the latex and effecting such motion in the latex comprises a shallow main tank 93 disposed at the bottom of the main framework and adapted to contain latex at a level to effect floating contact with the free loop of the belt B between the rolls 45 and 50. The tank 93 extends somewhat beyond the belt contacting zone at either end and an opening 94 is provided in the bottom of the tank in the left end extension. Underneath the opening 94 is provided a rotary impeller 95 driven by a motor 96 having a variable speed drive. The impeller receives latex through the opening 94 and directs it outward through the discharge conduit 97 which extends to the opposite end of the tank 93 and communicates with the tank at the side adjacent the right end. Gently curved baffles 98, 98, direct the latex from the conduit across the right end of the tank 93 and serve to distribute the flow of latex evenly across the tank as well as to direct it longitudinally of the tank, all designed to effect smooth, non-turbulent flow of the main body of latex in the direction of travel of the belt B. The current speed of the latex, of course, may be varied by varying the impeller speed as required to accommodate the latex current to the speed of the belt. In a typical commercial installation, a belt speed of eight linear feet per minute and an impeller speed of 20 R. P. M. have proved quite satisfactory.

It is frequently desirable to remove the belt B temporarily from contact with the latex L without disturbing the operating adjustment of the apparatus. For this purpose, mechanism for swinging the loop guide roll 45 upward and outward has been provided. Thus, the roll 45 is carried by front and rear swinging arms 101, 102 which are fixed rigidly to a cross-shaft 103 (see Fig. 5) journalled in front and rear arms 104, 105. The shaft 103 is adapted to be rotated by means of a lever 106 which is adapted to be locked in any desired position by means of a pin engaging a ratchet wheel 107 rigidly fixed to the arm 104. Thus, by manipulating the lever 106, the roll 45 may be swung through a wide arc sufficient to lift the belt B out of contact with the latex.

For varying the arc through which the roll 45 is swung and also for more or less permanently varying the operating position of the guide roll 45 with respect to the surface of the latex L and so varying the angle of emergence of the belt from the latex, provision is made for swinging the entire roll swinging mechanism described in the preceding paragraph through a further arc. Thus, the arms 104, 105 which carry the aforesaid mechanism are, in turn, rigidly fixed to a cross-shaft 108 journalled on the left end uprights 10 and 12. Fixed to one end of the shaft 108 is a quadrant plate 109 having locking holes adapted to be engaged by a locking pin 110 extending into a block 111 mounted on the upright 10. By adjusting the quadrant plate 109 upward or downward, the entire roll swinging mechanism may be swung through a considerable arc, independently, of course, of the adjustment effected by the lever 106. Ordinarily, more or less permanent adjustments are effected by the quadrant plate mechanism, while more or less temporary adjustments are effected by the lever-operated mechanism.

The freshly coagulated rubber or other sheet R, even though self-sustaining, is still quite tender when stripped from the belt B. In some instances, the tender sheet has been torn during the stripping operation due to difficulty in stripping the edges of the sheet where a slight lip is formed overhanging the edge of the belt B. It has been found that this difficulty may be eliminated by curling the edges of the coated belt upward in the zone where the rubber is being stripped so that the overhanging lip may be merely lifted from the upwardly curled edge instead of being pulled against it as normally is the case. Thus, short fingers 115, 115, of round metal rod may be disposed at an angle of about 45° adjacent the edge of the belt B in the stripping zone to curl the edges of the coated belt upward as shown in Fig. 4.

After the rubber sheet has been stripped, it is sometimes desirable to recondition the belt before it is again coated with coagulant and rubber, although such reconditioning usually is not essential to successful operation. If required, washing and drying the belt will effectively recondition it.

For washing the belt, a water spray pipe 120 is provided adjacent the downward reach of the belt B between the rolls 40 and 41 in such position as to spray water across the entire face of the belt which carried the deposited rubber sheet. For removing excess water, a wiper 121 is provided adjacent the loop of the belt about the roll 41, and a drain tank 122 having a flexible outlet pipe 123 is provided underneath the roll 41, the drain tank 122 being movable vertically with the roll 41.

For drying the belt, the horizontal reach passing over the rolls 35 to 38 is enclosed by a dryer D formed of a sheet metal top 130 attached underneath the tilting framework T, a sheet metal bottom 131 extending between the front and rear main stringers 17 and 18, and upper and lower front side member 132, 133 of sheet metal attached respectively to the tilting framework T and the front main stringer 17 so that the drier may open with the tilting framework. The rear main stringer 18 forms the rear side of the dryer D. Hot air may be supplied to the dryer by a duct 134, or other drying means may be provided. It accordingly appears that the apparatus described attains to a high degree the objects hereinabove set forth, and the advantages of the invention have been fully verified by extensive commercial operation of such apparatus in the manufacture of continuous rubber sheet as wide as 48''.

While the invention has been described in considerable detail with reference to a preferred procedure and apparatus for making rubber sheet, many of the principles herein set forth may be applied with equal facility to the application of permanent coatings to fabric or other sheet material as described in my copending application. Thus, the endless deposition belt B may be replaced by a sheet of fabric threaded through the apparatus and then removed with a permanent coating thereon. The term deposition base or belt as used in the claims accordingly includes all such temporary or permanent bases which may be passed through the apparatus to receive a temporary or permanent coating of rubber or other material, unless otherwise specifictlly indicated.

Similarly, other liquid coating dispersions of natural or synthetic rubber and rubber-like materials such as neoprene and poly-iso-butylene, and even dispersions of non-rubber-like materials may be employed in the apparatus instead of natural rubber latex. All such dispersions may contain added conditioning and compounding ingredients in major or minor proportions. The terms "latex" and "rubber" accordingly have been employed in the claims in a generic sense to include all such dispersions and materials.

Other modifications and variations may be effected without departing from the spirit and scope of the invention as defined by the appended claims.

I claim:

1. Apparatus for making rubber sheet from latex or analogous material, said apparatus comprising, in combination, a main framework, a tiltable framework mounted thereon, belt-guiding rolls including an adjustably positioned terminal roll mounted on the main framework, belt-guiding rolls mounted on the tiltable framework, a loop-guiding roll swingably mounted on the main framework, adjustable means for swinging the said loop-guiding roll to a desired position, a movable carriage, belt-guiding rolls including a terminal roll mounted on the movable carriage, a loop-guiding roll mounted on the carriage, a floatable deposition belt directed about the said rolls in a multi-looped path including a loop about the tiltable framework and a free loop depending from the aforesaid loop-guiding rolls, mechanism for driving at least some of the said rolls and causing the belt to travel continuously along said path, means on said carriage for applying a coagulant to the belt, a tank adapted to contain latex underneath the said free loop in such position that the loop will floatingly contact latex contained by the tank, means associated with the tank for circulating the latex in the belt-contacting zone in a direction parallel to the direction of travel of the belt, means for stripping a sheet of rubber from the belt, means for curling the edges of the belt in the stripping zone, and means along the path of the belt, between the stripping zone and the coagulant applying means, for reconditioning the belt.

2. Apparatus for making rubber sheet from latex or analogous material, said apparatus comprising, in combination, a framework, belt-guiding rolls including an adjustably-positioned terminal roll mounted on the framework, a movable carriage mounted on the framework, a belt-guiding roll mounted on the carriage, an endless, floatable deposition belt directed about the rolls on both the framework and the carriage in a path including a free loop, driving mechanism for causing the belt to travel continuously along said path, means on the carriage for applying coagulant to the belt, a tank adapted to contain latex adjacent said loop, and means for stripping a sheet of rubber from the belt.

3. Apparatus for making rubber sheet from latex or analogous material, said apparatus comprising, in combination, a framework, belt-guiding means including an adjustably-positioned terminal roll mounted on the framework, a carriage mounted for movement relative to the framework, a terminal roll mounted on the carriage, a floatable deposition belt directed about said rolls on both the framework and the carriage in a path including a free loop, driving mechanism for causing the belt to travel continuously along said path, a tank adapted to contain latex adjacent said free loop, and means for stripping a sheet of rubber from the belt.

4. In an apparatus for making rubber sheet from latex or analogous material, a travelling deposition belt, means for depositing rubber on one face and an edge of said belt, means for stripping the rubber from the belt, and means for curling the edge of the belt in the stripping zone to facilitate the stripping operation.

5. Apparatus for applying latex or other material to a travelling deposition belt, said apparatus comprising, in combination, a framework, belt-guiding rolls mounted on said framework in fixed positions, a loop-guiding roll swingably mounted on said framework, said rolls being so arranged as to direct a floatable deposition belt in a path including a free loop guided by said loop-guiding roll, driving mechanism for causing the belt to traverse said path in a continuous manner, a tank adapted to contain latex adjacent said loop in such position that the loop will floatingly contact latex contained by the tank, and means for adjusting the position of the swingable loop-guiding roll in such manner as to change the relation between the said free belt loop and latex in the tank.

6. In an apparatus for applying latex or other material to a travelling deposition belt, means for causing the belt to travel in a path including a free loop in floating contact with the latex, a swingably mounted roll guiding said loop, means for swinging said roll in an arcuate path to change the relation between the belt loop and the latex, and a second means for swinging the first means together with the roll in an arcuate path likewise to change the relation between the belt loop and the latex.

7. In an apparatus for applying latex or other material to deposition bases, a tank adapted to contain latex, means for bringing a floatable deposition base into progressive floating contact with latex contained by the tank, and means for circulating the latex in the base-contacting zone in a direction parallel to the direction of travel of the base.

8. In an apparatus for applying latex or other material to deposition bases, a tank adapted to contain latex, means for bringing a floatable deposition base into progressive floating contact with latex contained by the tank, and means for circulating the latex in the base-contacting zone in the same direction as the direction of travel of the base.

9. In an apparatus of the character described, a travelling deposition belt arranged in a path including a loop, belt guiding means supporting one reach of said loop, additional belt-guiding means supporting another reach of said loop, and framework supporting both said belt-guiding means, the portion of the framework supporting the first-said belt-guiding means being tiltably mounted with respect to the portion of the framework supporting the other belt-guiding means, whereby a portion of the framework and associated belt-guiding means may be tilted away from the other portion of the framework and associated belt-guiding means to permit inserting a reach of the belt loop therebetween.

10. In an apparatus of the character described, a main framework, an auxiliary framework hinged thereon for tilting movement relative thereto, belt-guiding means including a removable roll mounted on the main framework, belt-guiding means mounted on the auxiliary framework, and an endless deposition belt arranged about said belt-guiding means on both frameworks in a path including a loop about the auxiliary framework and the belt-guiding means thereon, whereby the auxiliary framework and associated belt-guiding means may be tilted away from the main framework and associated belt-guiding means to permit inserting a reach of the belt loop therebetween and, by additionally removing temporarily the removable roll, to permit removing and replacing the deposition belt while in endless form without removing all the belt-guiding means.

11. In an apparatus for applying latex or other material to deposition bases, a tank adapted to contain latex, means for causing a travelling deposition base to traverse a path including a free loop in floating contact with latex contained by the tank, means preceding said loop for applying coagulant to the belt, and means for varying the length of said loop in contact with the latex while maintaining substantially constant the conditions effecting application of the coagulant to the belt.

12. In an apparatus for applying latex or other material to deposition bases, a tank adapted to contain latex, means for causing a travelling deposition base to traverse a path including a free loop in floating contact with latex contained by the tank, means preceding the said free loop for applying coagulant to the belt, and means for shifting the position of the coagulant-applying means together with the adjacent belt reach preceding the zone of floating contact and thereby to vary the length of belt in contact with the latex.

13. The method of making rubber sheet from latex or analogous material, which comprises providing a body of latex, providing a deposition belt floatable on the latex, causing the deposition belt to traverse a path including a free loop in progressive floating contact with the latex, applying coagulant to the belt prior to its contact with the latex, circulating the latex in the belt-contacting zone in a direction parallel to the direction of travel of the belt, curling the edges of the belt after it leaves the latex, and stripping the deposited rubber from the belt at the curled zone.

14. The method of applying latex or other material to a deposition belt, which comprises providing a body of latex, bringing the deposition belt into progressive floating contact with the latex, and circulating the latex in the belt-contacting zone in a direction parallel to the direction of travel of the belt.

15. The method of applying latex or other material to a deposition belt, which comprises providing a body of latex, bringing the deposition belt into progressive floating contact with the latex, and circulating the latex in the belt-contacting zone in the same direction as the direction of travel of the belt.

16. The method of making rubber sheet from latex or analogous material, which comprises depositing a coating of latex rubber upon one face and an edge of a travelling deposition belt, curling the edge of the coated belt in a local zone, and stripping the rubber coating from the belt in the said zone.

MERRILL E. HANSEN.